United States Patent [19]

Vater et al.

[11] 4,337,195
[45] Jun. 29, 1982

[54] AZO DYESTUFFS

[75] Inventors: Hans-Joachim Vater, Cologne; Horst Nickel, Leverkusen; Hermann Henk, Cologne, all of Fed. Rep. of Germany

[73] Assignee: Bayer Aktiengesellschaft, Leverkusen, Fed. Rep. of Germany

[21] Appl. No.: 86,189

[22] Filed: Oct. 17, 1979

[30] Foreign Application Priority Data

Nov. 4, 1978 [DE] Fed. Rep. of Germany ....... 2847912

[51] Int. Cl.³ .............................................. C09B 45/00
[52] U.S. Cl. ................................................ 260/146 T
[58] Field of Search .................................... 260/146 T

[56] References Cited

U.S. PATENT DOCUMENTS

| | | | |
|---|---|---|---|
| 1,779,298 | 10/1930 | Straub et al. | 260/146 T |
| 2,653,149 | 9/1953 | Riat | 260/146 T |
| 2,749,206 | 6/1956 | Wegmann et al. | 260/146 T |
| 3,803,121 | 4/1974 | Gregory | 260/146 T |
| 4,010,150 | 3/1977 | Tabei et al. | 260/146 T |
| 4,054,559 | 10/1977 | Aoki et al. | 260/146 T |

FOREIGN PATENT DOCUMENTS 487982 3/1970 Switzerland .

Primary Examiner—Helen M. S. Sneed

Attorney, Agent, or Firm—Sprung, Felfe, Horn, Lynch & Kramer

[57] ABSTRACT

Azo dyestuffs of the formula

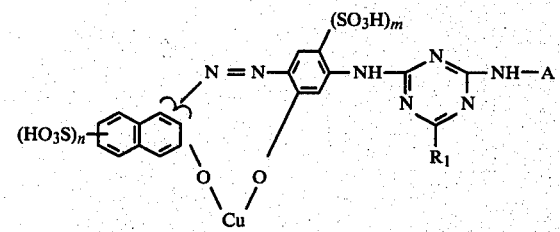

wherein A, $R_1$, m and n have the meaning given in the description.

The dyestuffs are suitable for dyeing cellulose-containing materials, especially cotton, which may be natural or regenerated, as well as union fabrics containing cotton, and paper. The dyestuffs in general give red to violet, as well as reddish brown, color shades.

The dyestuffs are distinguished by good light-fastness, substantivity and wet-fastness. Their great suitability for high temperature dyeing processes and for subsequent creaseproof finishing deserves particular mention.

7 Claims, No Drawings

AZO DYESTUFFS

The present invention relates to
1. Azo dyestuffs of the formula

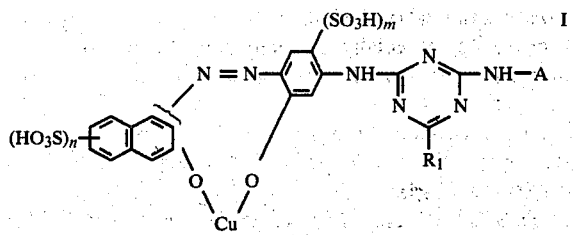

wherein

A is the radical of an optionally copper-containing monoazo or disazo dyestuff, the —NH— radical being bonded to an aromatic-carbocyclic C atom of the chromophore, $R_1$ is a substituent which is not fibre-reactive, m is 0 or 1 and n is 1 or 2, in particular 2. Azo dyestuffs of the formula I, in which A is the radical of an optionally copper-containing monoazo or disazo dyestuff which contains sulpho groups and/or carboxyl groups.

3. Azo dyestuffs according to 1 and 2, wherein A is a radical of an optionally copper-containing monoazo or disazo dyestuff of the naphthalene-azo-benzene, naphthalene-azo-benzene-azo-benzene, benzene-azo-benzene, benzene-azo-benzene-azo-benzene, benzene-azo-benzene-azo-naphthalene, benzene-azo-naphthalene, benzene-azo-naphthalene-azo-benzene, benzene-azo-naphthalene-azo-naphthalene or naphthalene-azo-naphthalene series.

4. Azo dyestuffs according to 1 and 2, wherein A is the radical of a copper-containing monoazo or disazo dyestuff, in particular —naphthalene—azo—benzene, or
└────Cu────┘

—naphthalene—azo—benzene—azo—benzene or
└────Cu────┘

—naphthalene—azo—naphthalene or —benzene—azo—
└────Cu────┘ naphthalene—azo—benzene or —benzene—azo—naphthalene.
└────Cu────┘                └────Cu────┘

5. Azo dyestuffs according to 1-3, wherein A is the radical of a metal-free monoazo or disazo dyestuff, of the formula —$A_1$—N=N—$A_2$, —$A_1$—N=N—$A_3$—N=N—$A_2$, —$A_1$—N=N—$A_4$, —$A_5$—N=N—$A_2$, —$A_5$—N=N—$A_3$—N=N—$A_2$, —$A_5$—N=N—$A_4$ or —$A_5$—N=N—$A_6$—N=N—$A_2$, wherein $A_1$ is the radical of a hydroxynaphthalenesulphonic acid, $A_2$ is a radical of the benzene series, especially a phenyl radical which is optionally substituted by sulpho, alkoxy (preferably methoxy), alkyl (preferably methyl), carboxyl, halogen or acylamino (preferably acetylamino, benzoylamino and ureido), $A_3$ is an optionally substituted phenylene radical, especially a phenylene radical which is optionally substituted by sulpho, alkoxy (preferably methoxy) or alkyl (preferably methyl), $A_4$ is a radical of the naphthalene series, especially a naphthalene radical which is optionally substituted by sulpho or alkoxy (preferably methoxy or ethoxy), $A_{4'}$ is a radical of the naphthalene series, like $A_4$, especially a naphthalene radical substituted by hydroxyl, $A_5$ is a radical of the benzene series, especially a phenyl radical which is optionally substituted by sulpho, alkoxy (preferably methoxy), alkyl (preferably methyl) or acylamino (preferably acetyl, carbonylamino or benzoyl), and $A_6$ is a radical of the naphthalene series, especially a 1,4-naphthylene radical which is optionally substituted by sulpho.

6. Azo dyestuffs according to 1-3 and 5, wherein:

$A_1$ is

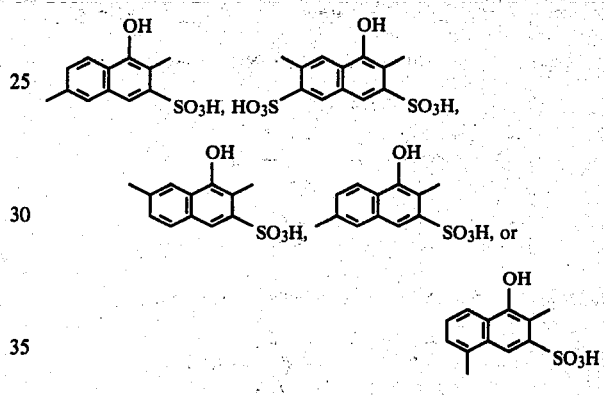

$A_2$ is

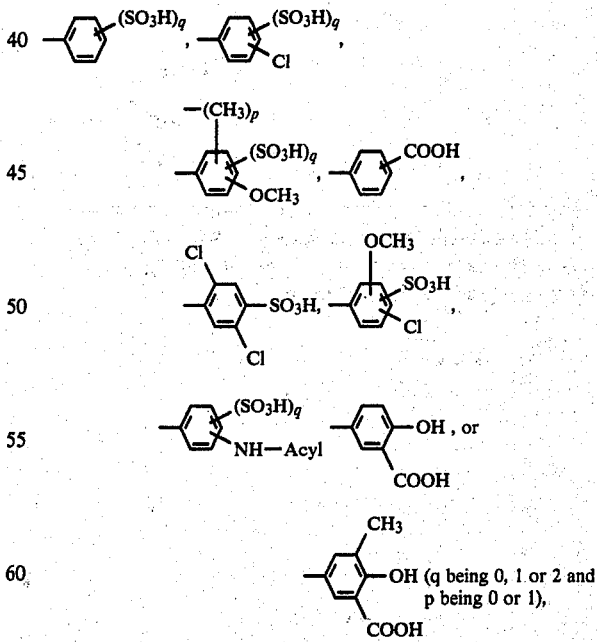

$A_3$ is

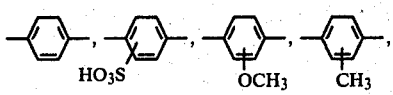

-continued

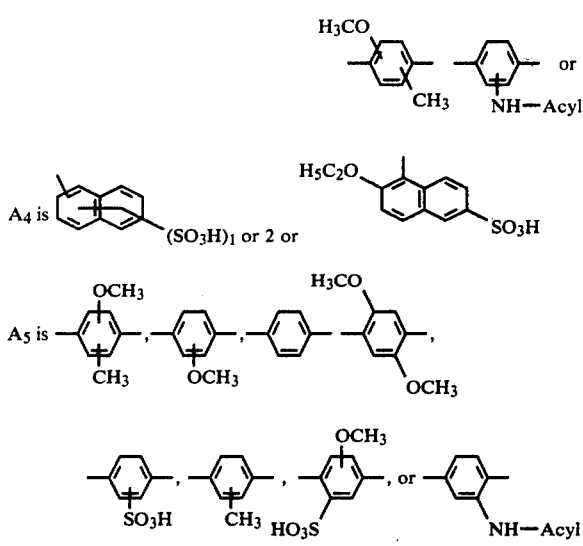

(wherein Acyl is —CO—CH₃, —CO—NH₂ or —CO—C₆H₅),

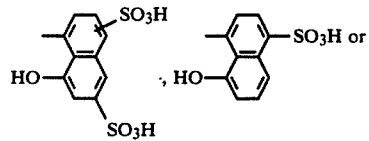

A₄' has one of the meanings of A₄ or is

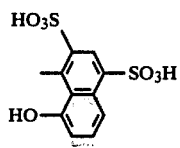

7. Azo dyestuffs according to 1–4, wherein
A is the radical of a copper-containing monoazo or disazo dyestuff of the formulae:

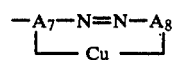
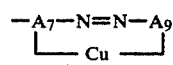
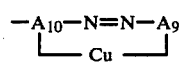
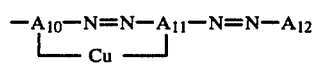
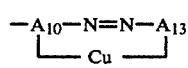

-continued

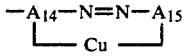

wherein

A₇ is a radical of the hydroxybenzene or carboxybenzene series, especially a phenylene radical which is optionally substituted by sulpho and/or alkyl (preferably methyl), A₈ is a radical of the hydroxysulphonaphthalene series, in particular optionally acylaminosubstituted hydroxysulphonaphthalene, A₉ is a radical of the hydroxybenzene and/or carboxybenzene series, especially optionally substituted by sulpho, alkyl (preferably methyl), alkoxy (preferably methoxy) or halogen (preferably chlorine), A₁₀ is a radical of the hydroxysulphonaphthalene series (as the coupling component), A₁₁ is a hydroxyphenylene radical, in particular optionally substituted by alkyl (preferably methyl), chlorine or methoxy, A₁₂ is a radical of the benzene series, in particular a phenyl radical which is optionally substituted by carboxyl, sulpho, alkyl (preferably methyl), alkoxy (preferably methoxy) or halogen (preferably chlorine), A₁₃ is a radical of the hydroxynaphthalene series (as the diazo component), A₁₄ is a radical of the 1-hydroxynaphthalene-4-sulphonic acid series and A₁₅ is a radical of the hydroxy-peri-hydroxynaphthalenesulphonic acid series.

8. Azo dyestuffs according to 1–4 and 7, wherein

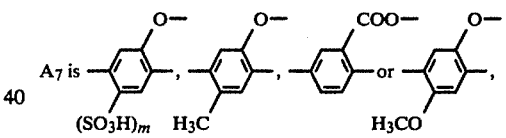

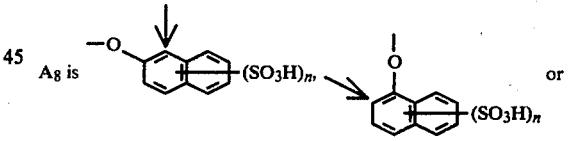

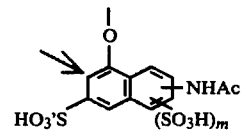

(Ac being —COCH₃ or —CO—C₆H₅),

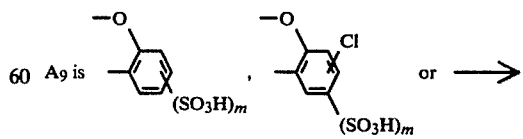

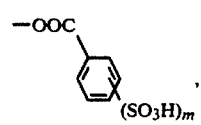

-continued $A_{10}$ is 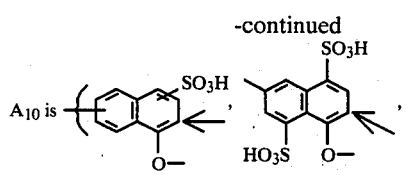

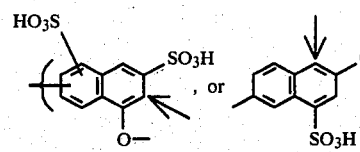

$A_{11}$ is 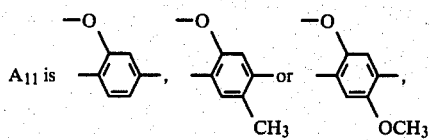

$A_{12}$ is 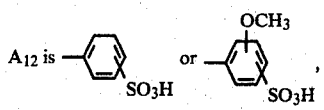

$A_{13}$ is 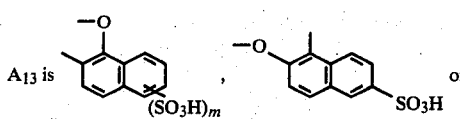

$A_{14}$ is 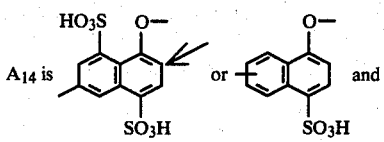 and $A_{15}$ is 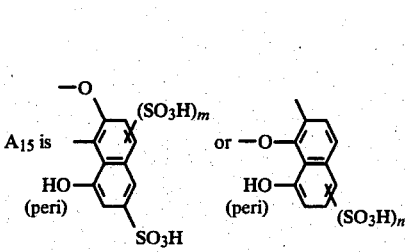

Examples of suitable substituents in formula I are amino groups, such as

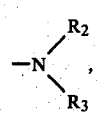

or —OR$_4$ or —SR$_4$ groups,
wherein

R$_2$ and R$_3$ independently of one another are hydrogen, amino, low-molecular alkyl, aryl or aralkyl, or R$_2$ and R$_3$ together, optionally with inclusion of one or more hetero-atoms, especially oxygen and nitrogen, form a ring, especially a 5-membered or 6-membered ring, and R$_4$ represents hydrogen, alkyl, aryl or aralkyl.

The alkyl, aryl or aralkyl radicals can have customary substituents, preferably hydroxyl, halogen, alkoxy (preferably methoxy), carboxyl and sulpho radicals.

Substituents R$_1$ which deserve particular mention are amino, methylamino, dimethylamino, ethylamino, diethylamino, 2-hydroxyethylamino, bis-(2-hydroxyethyl)-amino, alkylamino, dialkylamino, methoxyethylamino, sulphatomethylamino, carboxymethylamino, N-methyl-N-carboxymethylamino, carboxyethylamino, N-methyl-N-sulphatomethylamino, sulphatoethylamino, N-methyl-N-sulphatoethylamino, cyclohexylamino, pyrrolidino, piperidino, 1-methylpiperazino, morpholino, 4-morpholineamino, benzylamino or optionally substituted phenylamino or naphthylamino.

Preferred azo dyestuffs are those of the formula:

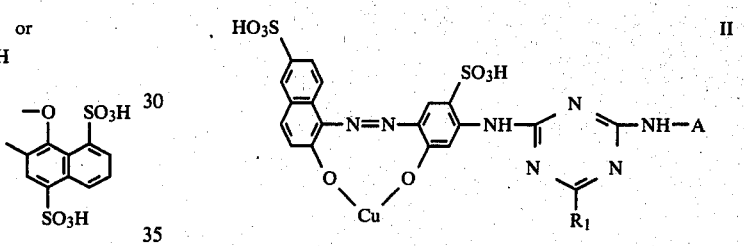  II wherein A and R$_1$ are as defined above.

Particularly preferred azo dyestuffs are those of the formula

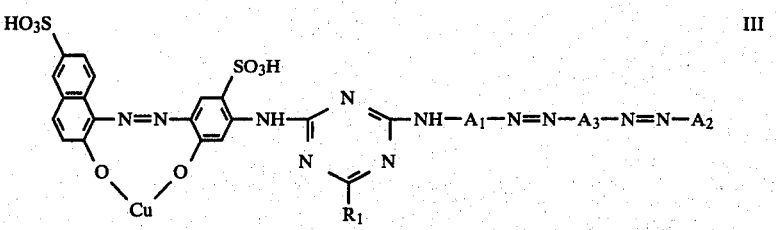  III wherein

A$_1$ to A$_3$ are as defined above and

R$_1$ is preferably an ethanolamine, diethanolamine or —NH$_2$ radical.

The compounds of the formula I are prepared by reacting 1 mol of cyanuric trihalide with, firstly, 1 mol of an aminoazo compound of the formula

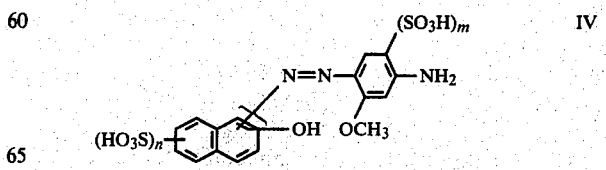  IV or optionally 1 mol of the corresponding copper complex of the formula

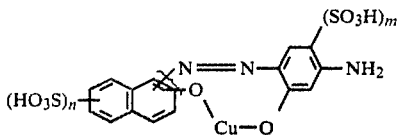

secondly with 1 mol of an aminoazo compound of the formula $$H_2N-A \qquad VI$$

wherein A is as defined above, and, thirdly, with 1 mol of a compound of the formula $$H-R_1$$

wherein $R_1$ has the above meaning, and compounds of the type

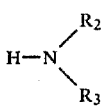

are preferred.

As an alternative it is possible to use, instead of the aminoazo compound of the formula VI, a compound of the formula $$H_2N-A_1 \qquad VII$$

or $$H_2N-A_{10} \qquad VIII$$

wherein $A_1$ and $A_{10}$ are as defined above.

The coupling with a diazotised compound of the formula $H_2N-A_2$ or $H_2N-A_3-N=N-A_2$ or $H_2N-A_9$ or $H_2N-A_{11}-N=N-A_{12}$ wherein $A_2$, $A_3$, $A_9$, $A_{11}$ and $A_{12}$ are as defined above, can optionally be carried out after the second or third condensation, preferably after the second condensation.

The coppering can be carried out on the starting azo compounds, before the condensations, or, preferably, after the third condensation, and is carried out under customary conditions. Under certain circumstances, it can be advantageous to carry out a reaction in an autoclave. The final compounds can be isolated in the usual manner by salting out from the reaction mixture, if desired also from acid solution.

The aminoazo compounds of the formulae IV, V and VI are either known compounds or compounds which can be prepared from known starting compounds by customary methods known from the literature.

Suitable cyanuric trihalides are cyanuric bromide, cyanuric fluoride and cyanuric chloride, of which the last-mentioned is preferred.

The condensations are carried out in a manner known from the literature. The preferred reaction conditions are:

Replacement of the 1st halogen atom at $-3°$ to $+25°$ C. and pH values of 3-7, preferably 5° to 15° C. and pH 4.5-6.5, replacement of the 2nd halogen atom at 30° to 95° C. and pH values of 5-7.5, preferably 40° to 95° C. and pH 6-7 and replacement of the 3rd halogen atom at 70° to 105° C. and pH values of 5.5-9.5, preferably 95° to 105° C. and pH 7.5-8.5.

Aminoazo compounds of the formula IV are prepared by coupling diazotised 1-amino-2-methoxy-4-nitrobenzene or, preferably, 1-amino-2-methoxy-4-nitrobenzene-5-sulphonic acid with 1-naphthol-5-, 1-naphthol-6-, 1-naphthol-7- or 1-naphthol-8-monosulphonic acid or 1-naphthol-5,7-disulphonic acid or 2-naphthol-5-, 2-naphthol-6-, 2-naphthol-7- or 2-naphthol-8-monosulphonic acid or 2-naphthol-5,7- or 2-naphthol-6,8-disulphonic acid, preferably with 2-naphthol-6-sulphonic acid, followed by reduction of the nitro group to the amino group.

Where appropriate, the copper complexes of the formula V are prepared by reaction with copper donors, preferably copper sulphate in ammoniacal solution.

Dyestuffs of the formula VI are prepared by coupling diazotised amines or aminoazo compounds with suitable coupling components.

Examples of suitable coupling components are 6-amino-1-hydroxynaphthalene-3-sulphonic acid or -3,5-disulphonic acid, 7-amino-4-hydroxynaphthalene-1,5-disulphonic acid, 1-amino-2-methoxy-5-methylbenzene, 1-amino-2-methoxybenzene, aniline, m-toluidine or 1,3-diaminobenzene.

Examples of suitable diazotisable amines or aminoazo compounds are 2-, 3- or 4-aminobenzenesulphonic acid, 1-aminobenzene-2,4-, -2,5- or -3,5-disulphonic acid, 1-aminonaphthalene, 1-aminonaphthalene-4-, -5-, -6-, -7- or -8-monosulphonic acid or -4,6-, -4,7- or -5,7-disulphonic acid, 2-aminonaphthalene-5-, -6-, -7- or -8-monosulphonic acid or -4,8- or -5,7-disulphonic acid, 2-, 3- or 4-aminobenzoic acid, 5-amino-2-hydroxybenzoic acid, 5-amino-2-hydroxy-3-methylbenzoic acid, 1-amino-2-methoxybenzene, 3-amino-4-methoxybenzenesulphonic acid, 2-amino-5-methoxybenzenesulphonic acid, 5-amino-2-methoxybenzenesulphonic acid, 3-amino-5-chloro-4-hydroxybenzenesulphonic acid, 1-amino-8-hydroxynaphthalene-3,6-disulphonic acid, 1-amino-8-hydroxynaphthalene-4,6-disulphonic acid, 1-amino-2-methoxynaphthalene-6-sulphonic acid, 2-amino-5-[4-(sulphophenyl)azo]-benzenesulphonic acid, 4-aminoazobenzene-4'-sulphonic acid and 4-amino-3-methoxy-(3-sulphophenyl)-azobenzene.

Further suitable diazotisable aminoazo compounds are the aminoazo dyestuffs obtained by coupling the above-mentioned amines with 1-aminonaphthalene, 1-aminonaphthalene-5-sulphonic acid, 1-aminonaphthalene-6- or -7-sulphonic acid and 1-amino-2-methoxynaphthalene-6-sulphonic acid.

Dyestuffs of the formula VI can furthermore be prepared like dyestuffs of the formulae IV and V. Suitable compounds for their preparation are again the compounds mentioned for the dyestuffs of the formula IV and V.

Dyestuffs which carry complexable substituents, such as hydroxyl, carboxyl or methoxy, in the ortho-, ortho'-positions relative to the azo bridge, can be converted to the corresponding copper complex, if appropriate by demethylating coppering. Oxidative coppering of o-hydroxyazo compounds is an equally valuable method. Preferably, the coppering only takes place after the condensation with the chlorotriazine.

The dyestuffs are suitable for dyeing cellulose-containing materials, especially cotton, which may be natural or regenerated, as well as union fabrics containing cotton, and paper. The dyestuffs in general give red to violet, as well as reddish brown, colour shades.

The dyestuffs are distinguished by good light-fastness, substantivity and wet-fastness. Their great suitability for high temperature dyeing processes and for subsequent creaseproof finishing deserves particular mention.

EXAMPLE 1

93.4 parts of the aminoazo dyestuff prepared by coupling diazotised 5-amino-4-methoxy-2-nitro-benzenesulphonic acid with 6-hydroxynaphthalene-2-sulphonic acid and subsequently reducing the nitro group with sodium sulphide are dissolved in 700 parts of water. 35 parts of cyanuric chloride are added to this solution at 10°–15° C. and pH 6.0–6.5. The pH value is kept constant by adding sodium carbonate. After completion of the reaction, 122.7 parts of the aminoazo dyestuff (in the form of a 50% strength paste) prepared by alkaline coupling of diazotised 2-amino-5-[(4-sulphophenyl)-azo]-benzenesulphonic acid with 7-amino-4-hydroxynaphthalene-2-sulphonic acid are added and the mixture is heated to 95° C. at pH 6.5–7. The pH value is again kept constant by adding sodium carbonate. After completion of the reaction, 57.3 parts of monoethanolamine are added and the mixture is further kept at 95° C. When the third chlorine has also been replaced, 52 parts of crystalline copper sulphate, dissolved in 130 parts of 25% strength ammonia solution, are added, and boiling under reflux is continued until the coppering has been completed. Thereafter the mixture is allowed to cool to about 80° C., 15% by volume of potassium chloride are added and the pH value is brought to 3.5. After the mixture has cooled, the dyestuff which has precipitated can be filtered off. It corresponds to the formula

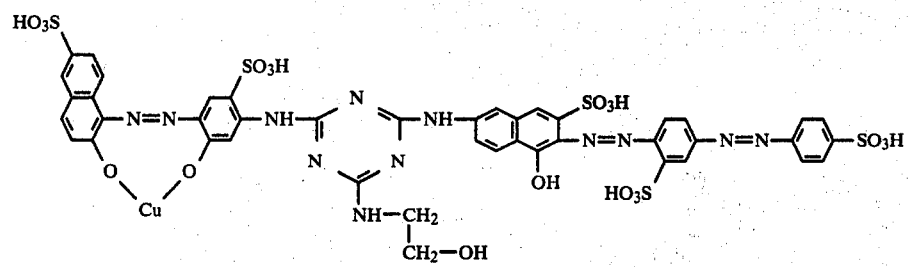

The dyestuff exhibits high substantivity and good light-fastness and dyes cotton and other cellulose-containing materials in bluish-tinged red colour shades. Because of its high resistance to hydrolysis, the dyestuff is also particularly suitable for dyeing cotton/polyester union fabrics by the HT method. The creaseproof finishing of the dyeing is entirely satisfactory.

EXAMPLE 2

The dyestuff is prepared according to Example 1, but instead of 57.3 parts of monoethanolamine 98.7 parts of diethanolamine are employed. The tinctorial properties of the dyestuff formed correspond to those of the dyestuff from Example 1.

EXAMPLE 3

The dyestuff is prepared according to Example 1, but instead of 57.3 parts of monoethanolamine 250 parts of 25% strength ammonia solution are added. To accelerate the coppering, 34.4 parts of monoethanolamine are added after replacement of the third chlorine atom.

EXAMPLE 4

102.3 parts of the azo dyestuff prepared by coupling diazotised 5-amino-4-methoxy-2-nitrobenzenesulphonic acid with 6-hydroxynaphthalene-2-sulphonic acid, reducing with sodium sulphide and carrying out a dealkylating coppering under the customary conditions, are dissolved in 700 parts of water and 35 parts of cyanuric chloride are added at 5° C. and pH 5.5–6. The pH value is kept at this level by adding sodium carbonate. After completion of the reaction, 118.6 parts of the aminoazo dyestuff, prepared by coupling diazotised 1-amino-8-benzenesulphoxynaphthalene-3,6disulphonic acid with 2-amino-4-methyl-anisole, are added and the mixture is heated to 40°–45° C. at pH 7–7.5. The pH value is maintained by adding sodium carbonate. After conclusion of the reaction, the product is salted out with 20% by volume of sodium chloride. The paste is stirred in 700 parts of water, 24 parts of monoethanolamine are added and the mixture is boiled under reflux until the third chlorine atom has been completely replaced. 2% of sodium hydroxide are then added and the benzenesulphonic acid ester is saponified. After completion of the saponification, 20% of sodium chloride are added and the mixture is stirred until cold. The dyestuff which has precipitated is filtered off. It corresponds to the formula:

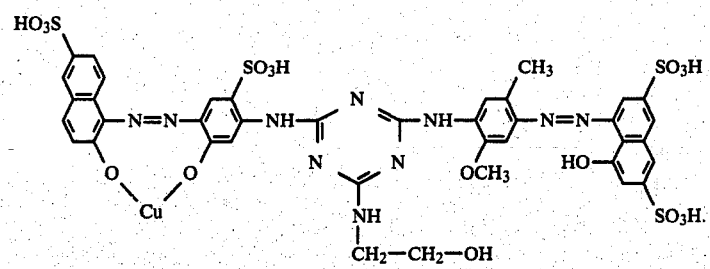

The dyestuff shows good substantivity and light-fastness and dyes cotton and other cellulose-containing materials in bluish-tinged red colour shades.

EXAMPLE 5

The dyestuff is prepared according to Example 4. However, instead of 24 parts of monoethanolamine, 41.4 parts of diethanolamine are employed. The tinctorial properties of the dyestuff formed correspond to those of the dyestuff from Example 4.

EXAMPLE 6

The dyestuff is prepared according to Example 4. However, the dyestuff paste is reacted in a mixture of 350 parts of water and 350 parts of a 25% strength ammonia solution, instead of 24 parts of monoethanolamine in 700 parts of water. The tinctorial properties of the dyestuff formed correspond to those of the dyestuff from Example 4.

EXAMPLE 7

93.4 parts of the aminoazo dyestuff prepared by coupling diazotised 5-amino-4-methoxy-2-nitro-benzenesulphonic acid with 6-hydroxynaphthalene-2-sulphonic acid and subsequently reducing the nitro group with sodium sulphide are dissolved in 700 parts of water. 35 parts of cyanuric chloride are introduced into this solution at 10°-15° C. and pH 6.0-6.5. The pH value is kept constant by adding sodium carbonate. After completion of the reaction, 49 parts of 2-amino-5-hydroxynaphthalene-7-sulphonic acid are added and the mixture is warmed to 40° at pH 6-6.5. The pH value is kept constant by adding sodium carbonate. After completion of the reaction, a suspension of 42 parts of diazotised 2-amino-5-methoxy-benzenesulphonic acid is added. Coupling is carried out in a weakly acid to neutral range. After completion of coupling, 57.3 parts of monoethanolamine are added and the mixture is boiled under reflux. After replacement of the third chlorine atom, coppering and isolation are carried out as in Example 1.

The dyestuff corresponds to the formula:

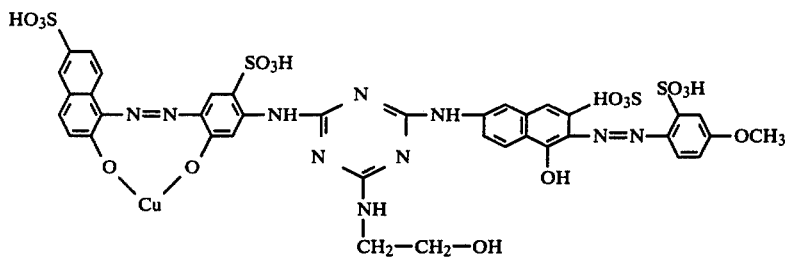

The dyestuff dyes cotton and other cellulose-containing materials in red colour shades.

If instead of 2-amino-5-methoxybenzenesulphonic acid the equivalent amount of 2-amino-5-ethoxybenzenesulphonic acid is used, a similar dyestuff is obtained.

EXAMPLE 8

The dyestuff is prepared according to Example 7, but instead of the 57.3 parts of monoethanolamine 98.7 parts of diethanolamine are employed. The tinctorial properties of the dyestuff formed correspond to those of the dyestuff from Example 7.

EXAMPLE 9

93.4 parts of the aminoazo dyestuff prepared by coupling diazotised 5-amino-4-methoxy-2-nitrobenzenesulphonic acid with 6-hydroxynaphthalene-2-sulphonic acid and subsequently reducing the nitro group with sodium sulphide are dissolved in 700 parts of water and reacted with 35 parts of cyanuric chloride at 10°-15° C. and pH 6.0-6.5. The pH value is kept constant by adding sodium carbonate. After completion of the reaction, a further 91 parts of the above dyestuff are added and the mixture is heated to 95° C. at pH 6.0-6.5. The pH value is maintained by further addition of sodium carbonate. After complete replacement of the second chlorine atom, 57.3 parts of monoethanolamine are added and the mixture is boiled under reflux until the replacement of the third chlorine atom of the cyanuric chloride has been completed. 104 parts of copper sulphate, dissolved in 260 parts of 25% strength ammonia solution, are then added and boiling under reflux is continued until the coppering has been completed. The mixture is then allowed to cool to about 80° C., 10% by volume of sodium chloride are added and the pH value is brought to 3. After cooling the dyestuff is filtered off.

The dyestuff corresponds to the formula

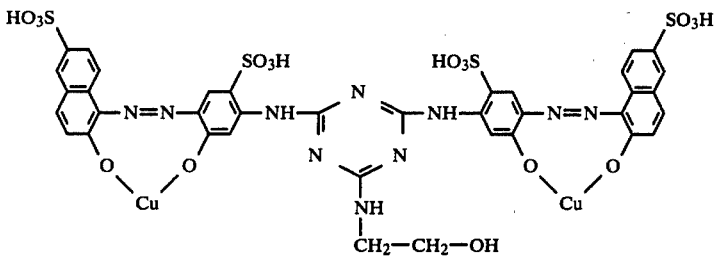

The dyestuff is distinguished by excellent light-fastness and dyes cotton and other cellulose-containing materials in red-violet shades.

EXAMPLE 10

The dyestuff is prepared according to Example 9. However, instead of the 57.3 parts of monoethanolamine, 98.7 parts of diethanolamine are employed. The tinctorial properties of the dyestuff correspond to those of the dyestuff from Example 9.

If instead of diethanolamine methylamine, dimethylamine, diisopropanolamine, dipropylamine, aniline, N-methylaniline, aniline-3- or -4-sulphonic acid, 2- or 3-aminotoluene or 2- or 3-aminotoluenesulphonic acid is employed, similar red-violet cotton dyestuffs are obtained.

EXAMPLE 11

93.4 parts of the aminoazo dyestuff prepared by coupling diazotised 5-amino-4-methoxy-2-nitrobenzenesulphonic acid with 5-hydroxynaphthalene-1-sulphonic acid and subsequently reducing the nitro group with sodium sulphide are dissolved in 700 parts of water and reacted with 35 parts of cyanuric chloride at 10°–15° C. at pH 6.0–6.5. The pH value is kept constant by adding sodium carbonate. After completion of the reaction, a further 91 parts of the dyestuff are added and the mixture is heated to 95° C. at pH 6.0–6.5. The pH value is maintained by further addition of sodium carbonate. After complete replacement of the second chlorine atom, 57.3 parts of monoethanolamine are added and the mixture is boiled under reflux until the replacement of the third chlorine atom is complete. 104 parts of copper sulphate, dissolved in 260 parts of 25% strength ammonia solution, are then added and boiling under reflux is continued until the coppering has been completed. The mixture is then allowed to cool to about 80° C., 10% by volume of sodium chloride are added and the pH is brought to 3. After cooling, the dyestuff can be filtered off.

The dyestuff corresponds to the formula

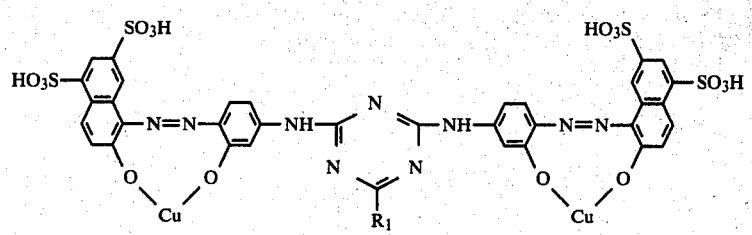

The dyestuff dyes cotton and other cellulose-containing materials in red-violet colour shades. The dyestuff exhibits good light-fastness and good substantivity.

EXAMPLE 12

The dyestuff of the formula

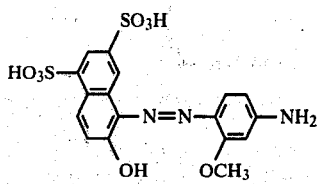

prepared by coupling diazotised 1-amino-2-methoxy-4-nitrobenzene with 2-hydroxynaphthalene-5,7-disulphonic acid and subsequently reducing with sodium sulphide, is reacted analogously to the above example to give the symmetrical disazo dyestuff:

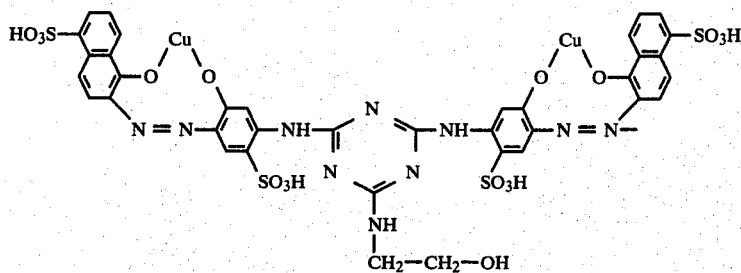

wherein $R_1$ is the radical of ammonia, ethanolamine, diethanolamine or diethylamine. These products give red-violet dyeings on cotton.

The table which follows shows further dyestuffs which are prepared analogously to the above examples, and their colour shade on cotton. (In this table, in the $R_1$ column, ME denotes the radical of monoethanolamine and DE the radical of diethanolamine; D denotes the diazo component and K the coupling component of the azo dyestuff NA—A.)

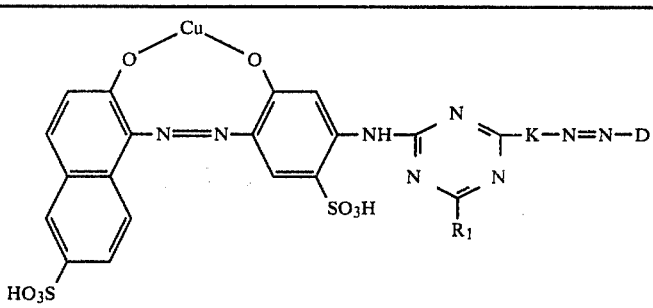

| K | D | $R_1$ | Colour shade |
|---|---|---|---|
| 2-Amino-5-naphthol-7-sulphonic acid | 5-Amino-2-methoxybenzenesulphonic acid | ME | red |
| 2-Amino-5-naphthol-7-sulphonic acid | " | DE | " |
| 2-Amino-5-naphthol-7-sulphonic acid | " | $-NH_2$ | " |
| 2-Amino-5-naphthol-7-sulphonic acid | " | $-NHC_2H_5$ | " |
| 2-Amino-5-naphthol-7-sulphonic acid | " | $N(C_2H_5)_2$ | " |
| 2-Amino-5-naphthol-7-sulphonic acid | " | $-N(CH_2\underset{OH}{\overset{|}{C}}HCH_3)_2$ | " |
| Aniline | 4-Amino-benzenesulphonic acid | ME | red-brown |
| " | " | DE | red-brown |
| " | " | $-NH_2$ | red-brown |
| " | 5-Amino-2-hydroxybenzoic acid | ME | red-brown |
| " | " | DE | red-brown |
| " | " | $-NH_2$ | red-brown |
| Aniline | 5-Amino-2-hydroxybenzoic acid | $-N(C_2H_5)_2$ | red-brown |
| 2-Amino-anisole | 3-Amino-benzenesulphonic acid | ME | red-brown |
| " | " | DE | red-brown |
| " | " | $-NH_2$ | red-brown |
| 3-Amino-toluene | 3-Amino-naphthalene-1,5-disulphonic acid | ME | red-brown |
| " | " | DE | red-brown |
| " | " | $-NH_2$ | red-brown |
| " | 4-Aminoazobenzene-3,4'-disulphonic acid | ME | red-brown |
| " | " | DE | red-brown |
| " | " | $-NH_2$ | red-brown |
| 3-Aminophenyl-urea | " | ME | red-brown |
| " | " | DE | red-brown |
| " | " | $-NH_2$ | red-brown |

The table which follows shows further bis-copper complex dyestuffs

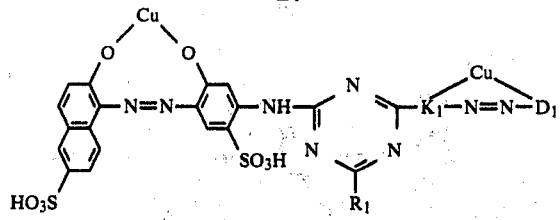

which are prepared analogously to Examples 9/10, and their colour shade on cotton. (The abbreviations are as for the preceding table).

| $K_1$ | $D_1$ | $R_1$ | Colour shade |
|---|---|---|---|
| 2-Amino-5-naphthol-7-sulphonic acid | 2-Aminobenzoic acid | ME | bluish-tinged red |
| 2-Amino-5-naphthol-7-sulphonic acid | 2-Aminobenzoic acid | DE | bluish-tinged red |
| 2-Amino-5-naphthol-7-sulphonic acid | 3-Amino-4-methoxy-benzenesulphonic acid | ME | bluish-tinged red |
| 2-Amino-5-naphthol-7-sulphonic acid | 3-Amino-4-methoxy-benzenesulphonic acid | DE | bluish-tinged red |
| 2-Amino-5-naphthol-7-sulphonic acid | 3-Amino-4-methoxy-benzenesulphonic acid | —$NH_2$ | bluish-tinged red |
| 2-Amino-5-naphthol-7-sulphonic acid | 4-Amino-3-methoxyazobenzene-3'-sulphonic acid | ME | violet |
| 2-Amino-5-naphthol-7-sulphonic acid | 4-Amino-3-methoxyazobenzene-3'-sulphonic acid | DE | " |
| 2-Amino-5-naphthol-7-sulphonic acid | 4-Amino-3-methoxyazobenzene-3'-sulphonic acid | —$NH_2$ | " |
| 2-Amino-5-naphthol-1,7-disulphonic acid | 2-Amino-anisole | ME | bluish-tinged red |
| 2-Amino-5-naphthol-1,7-disulphonic acid | 2-Amino-anisole | DE | bluish-tinged red |
| 2-Amino-5-naphthol-1,7-disulphonic acid | 2-Amino-anisole | —$NH_2$ | bluish-tinged red |
| 2-Amino-5-naphthol-1,7-disulphonic acid | 1-Amino-2-methoxy-naphthalene-6-sulphonic acid | ME | violet |
| 2-Amino-5-naphthol-1,7-disulphonic acid | 1-Amino-2-methoxy-naphthalene-6-sulphonic acid | DE | " |
| 2-Amino-5-naphthol-1,7-disulphonic acid | 4-Amino-3-methoxyazobenzene-3'-sulphonic acid | ME | " |
| 2-Amino-5-naphthol-1,7-disulphonic acid | 4-Amino-3-methoxyazobenzene-3'-sulphonic acid | DE | " |
| 2-Amino-5-naphthol-4,8-disulphonic acid | 3-Amino-4-methoxybenzenesulphonic acid | ME | violet |
| 2-Amino-5-naphthol-4,8-disulphonic acid | " | —$NH_2$ | " |
| 2-Amino-5-naphthol-4,8-disulphonic acid | 2-amino-anisole | ME | " |
| 2-Amino-5-naphthol-4,8-disulphonic acid | " | DE | " |
| 2-Amino-5-naphthol-4,8-disulphonic acid | 4-Aminobenzenesulphonic acid | ME | " |
| 2-Amino-5-naphthol-4,8-disulphonic acid | " | —$NH_2$ | " |

If the monoazo compounds employed in Examples 11 and 12 are used for the first condensation with cyanuric chloride, whilst employing the second colour components shown in the tables (K—N=N—D— or $K_1$—N=N—$D_1$) and the amines shown in the tables as the third component, dyestuffs are obtained which dye cotton in similar shades to those shown in the tables.

We claim:
1. Azo dyestuffs of the formula

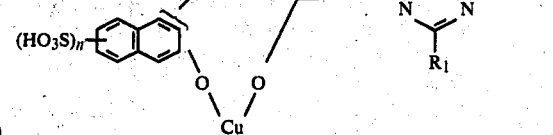

wherein

A is the radical of a non-copper-containing monoazo or disazo dyestuff of the naphthalene-azo-benzene, naphthalene-azo benzene-azo-benzene, benzene-azo-benzene, benzene-azo-benzene-azo-benzene, benzene-azo-benzene-azo-naphthalene, benzene-azo-naphthalene, benzene-azo-naphthalene-azo-benzene, benzene-azo-naphthalene-azo-naphthalene or naphthalene-azo-naphthalene series, $R^1$ is amino, methylamino, dimethylamino, ethylamino, diethylamino, 2-hydroxyethylamino, bix-(2-hydroxyethyl)-amino, alkylamino, dialkylamino, methoxyethylamino, sulphatomethylamino, carboxymethylamino, N-methyl-N-carboxymethylamino, carboxyethylamino, N-methyl-N-sulphatomethylamino, sulphatoethylamino, N-methyl-N-sulphatoethylamino, cyclohexylamino, pyrrolidino, piperidino, 1-methylpiperazino, morpholino, 4-morpholineamino, benzylamino or said phenylamino or naphthylamino being unsubstituted or substituted by hydroxyl, halogen, alkoxy, carboxyl or sulpho, m is 0 or 1 and n is 1 or 2.

2. Azo dyestuffs according to claim 1, wherein A is the radical of a non-copper-containing monoazo or disazo dyestuff which contains sulpho groups and/or carboxyl groups.

3. Azo dyestuffs according to any one of claims 2, or 1, wherein
A is the radical of a metal-free monoazo or disazo dyestuff, of the formula $—A_1—N=N—A_2$, $—A_1—N=N—A_3—N=N—A_2$, $—A_1—N=N—A_4$, $—A_5—N=N—A_2$, $—A_5—N=N—A_3—N=N—A_2$, $—A_5—N=N—A_4$ or $—A_5—N=N—A_6—N=N—A_2$, wherein
$A_1$ is the radical of a hydroxynaphthalenesulphonic acid,
$A_2$ is a radical of the benzene series,
$A_3$ is a phenylene radical, optionally substituted by sulpho, alkoxy or alkyl,
$A_4$ is a radical of the naphthalene series, optionally substituted by sulpho or alkoxy,
$A_{4'}$ is $A_4$, optionally substituted by hydroxyl, sulpho or alkoxy,
$A_5$ is a radical of the benzene series, optionally substituted by sulpho, alkoxy alkyl or acylamino, and
$A_6$ is a radical of the naphthalene series, which is optionally substituted by sulpho.

4. Azo dyestuffs of the formula

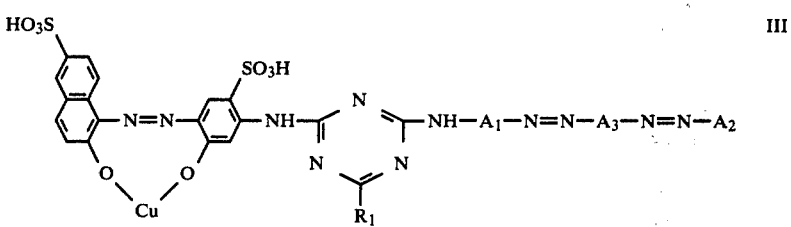

wherein
A has the meaning indicated in any one of claims 2, 3, and 1
$R_1$ is a substituent which is not fibre-reactive.

5. Azo dyestuffs of the formula

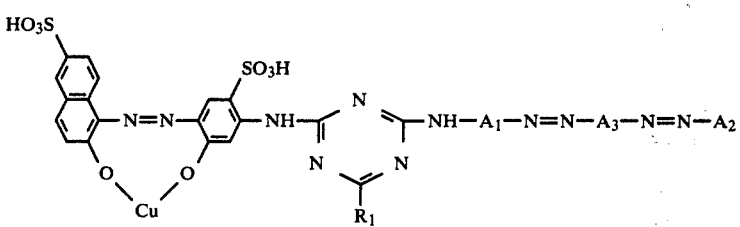

wherein
$A_1$, $A_2$ and $A_3$ have the meaning given in claim 5 and $R_1$ represents a substituent which is not fibre-reactive.

6. Azo dyestuffs of claim 5, wherein $R_1$ is an ethanolamine, diethanolamine or $NH_2$ radical.

7. Azo dyestuffs according to claim 3 wherein
$A_2$ is a phenyl radical optionally substituted by sulpho, methoxy, methyl, carboxyl, halogen, acetylamino, benzoylamino or ureido,
$A_3$ is a phenylene radical optionally substituted by sulpho, methoxy or methyl,
$A_4$ is a radical of the naphthalene series optionally substituted by sulpho, methoxy or ethoxy,
$A_{4'}$ is as defined in claim 5,
$A_5$ is a phenyl radical optionally substituted by sulpho, methoxy, methyl acetyl, carbonylamino or benzoyl, and
$A_6$ is a 1,4-naphthalene radical optionally substituted by sulpho.

* * * * *